INVENTOR.
Eric J. Opitz
BY
E.J. Biskup
ATTORNEY

May 28, 1968  E. J. OPITZ  3,385,207

UNITIZED WELDING PRESS

Filed Nov. 9, 1966  2 Sheets-Sheet 2

INVENTOR.
Eric J. Opitz
BY
E. J. Biskup
ATTORNEY 3,385,207
UNITIZED WELDING PRESS
Eric J. Opitz, Franklin, Mich., assignor to General Motors Corporation, Detroit, Mich., a corporation of Delaware
Filed Nov. 9, 1966, Ser. No. 593,190
9 Claims. (Cl. 100—214)

This invention relates to welding machines and more particularly to a unitized welding press.

Welding presses of conventional design normally incorporate framework of four poster design with a stationary upper platen and a movable lower platen. Power means for operating the press are usually located below the lower platen, resulting in a press of considerable overall height which necessitates placement of the automatic shuttle lines that move and index the parts to be welded at a considerable height above the plant floor. In addition, the press height, as governed by the conventional construction, has the disadvantage of limiting the areas within a plant which can be used for welding press lines. Another drawback is that such presses are permanently installed, making their movement a major maintenance project.

The above-mentioned disadvantages of conventional welding presses are overcome by the unitized welding press of the present invention which comprises two mechanically identical side members operatively interconnected by removable cross members. Each side member includes a structural frame assembly within which is mounted the press drive means and a counter-balance cylinder effective to balance the weight of the movable press components. The side members are easily disconnected and separately usable as pedestal presses. The building block principle of the design together with the low overall height of the side members permits versatile usage of the equipment and makes possible its use in plant areas formerly unusable for welding press lines. It also provides for quick changing of welding fixtures as well as replacement of one press in a welding line by another with the welding fixture installed.

One feature of this invention is that it provides a unitized welding press comprising identical, opposed side members interconnected by rigid cross-members to form a support structure adapted to receive and support an insertable welding fixture between the side members and wherein the movable die of the fixture is raised to press-closed position by synchronized drive means housed in each of the side members.

Another feature of this invention is that each side member is provided with a counter-balance cylinder for balancing the weight of the movable press components so that the force required to open and close the press is the same.

Yet another feature of this invention is that the counter-balance cylinder and press drive means are contained within the structural frame work of the side member, permitting the lower die of the press to be supported near the floor line to thus create a compact press of relatively low overall height.

Still another feature of the invention is that the side members are separately usable as pedestal-type presses.

A further feature of this invention is that the unitized press and each side member thereof is portable and easily transferable to different plant locations with a minimum of maintenance work.

A still further feature of this invention is that the span between the unitized press side members may be varied to accommodate welding fixtures of different widths.

These and other features of the invention will be made apparent to one skilled in the art in the following detailed description of the invention, reference being made to the accompanying drawings wherein.

Figure 1:
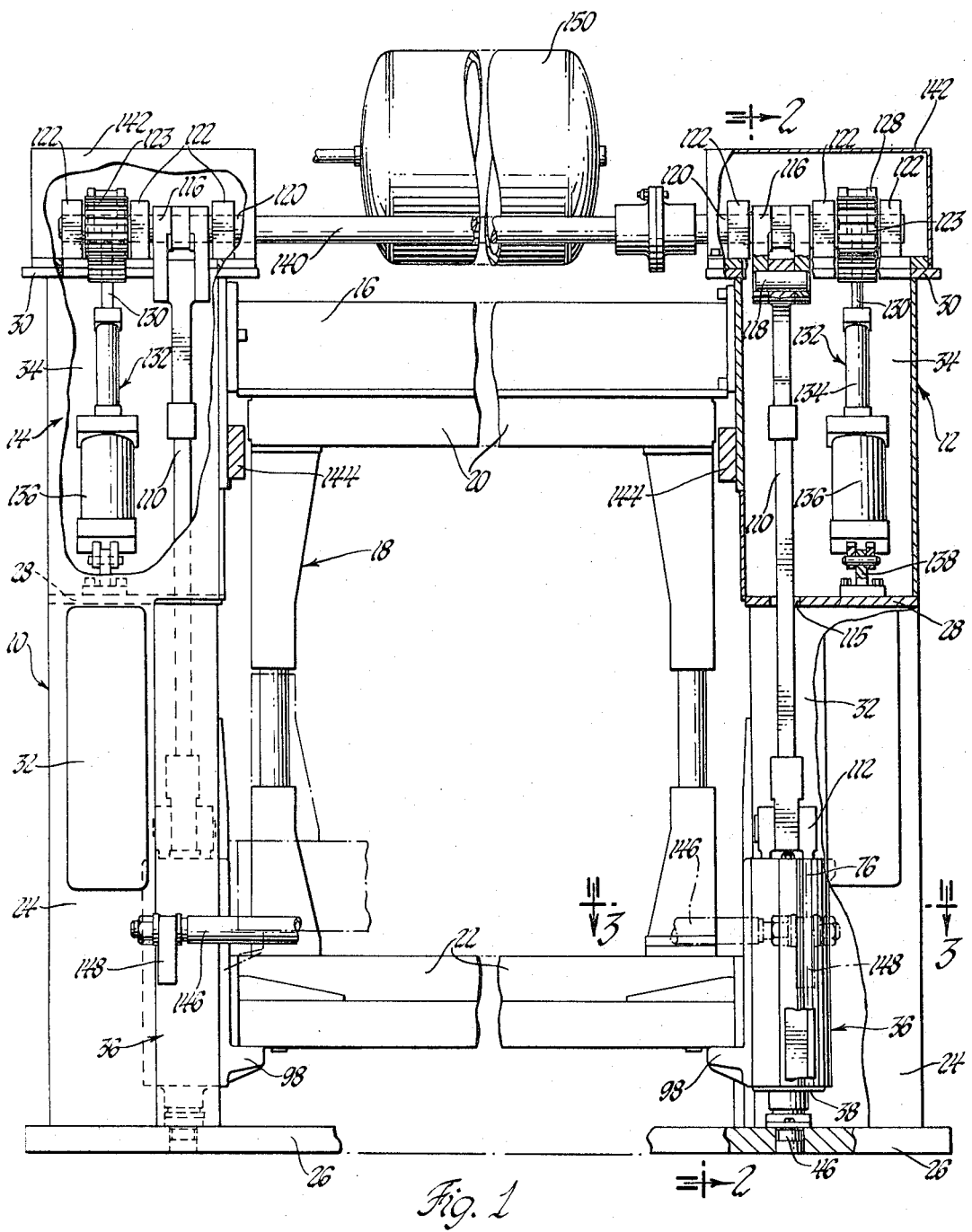
FIGURE 1 is a front elevational view, partially broken away and in section, of a unitized welding press according to this invention.
Figure 2:
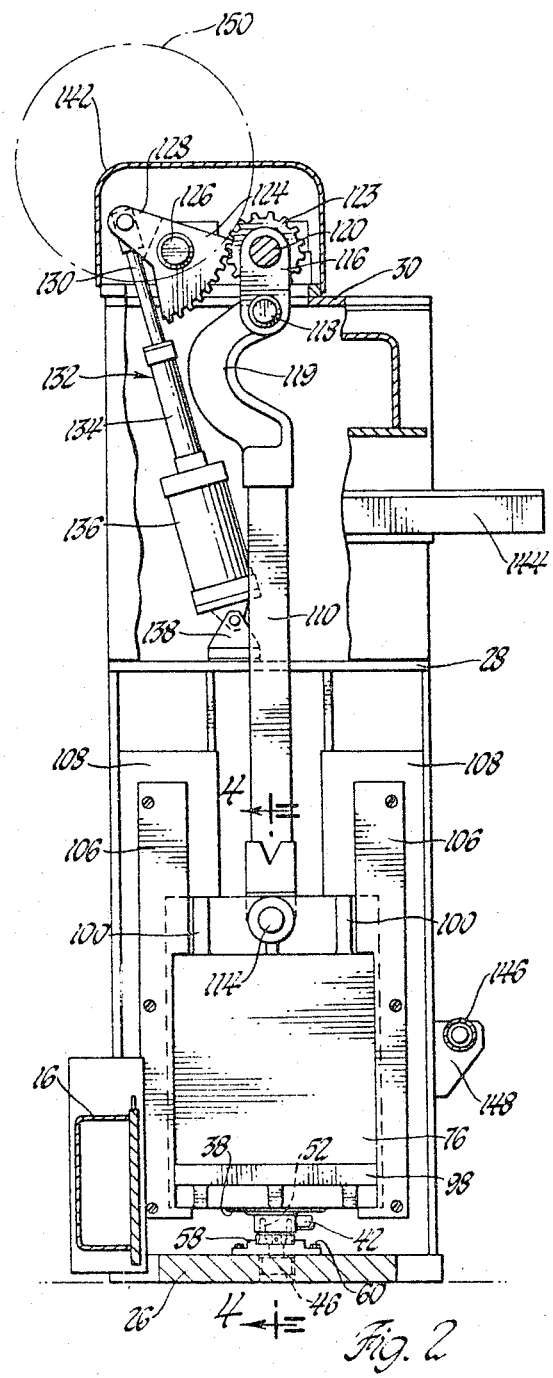
FIGURE 2 is a view partially in section of a side member of the unitized press taken generally in a plane indicated by line 2—2 of FIGURE 1.

Referring to the drawings and initially to FIGURE 1, there is shown a unitized welding press 10 which comprises identical, opposed side members 12 and 14 interconnected at top and bottom by rigid cross-members 16. An insertable welding fixture 18 is supported between side members 12, 14 and includes an upper stationary platen 20 and a lower platen 22 which is reciprocally movable vertically between press-open and press-closed positions.

Since the two side members 12 and 14 are structurally identical and differ only in hand so that the welding fixture support means of one faces that of the other, it is believed sufficient to describe only one side member 12 in detail, it being understood that the other side member 14 is of the same construction. Side member 12 includes an upstanding frame 24 of structurally rigid steel plate construction suitably anchored to a base 26 and having horizontally disposed support members 28 and 30 which divide the frame into main compartmented areas 32, 34. Frame 24 serves as the superstructure upon which the press mechanical components to be hereinafter described are supported and additionally provides protective cover for these components.

Figure 3:
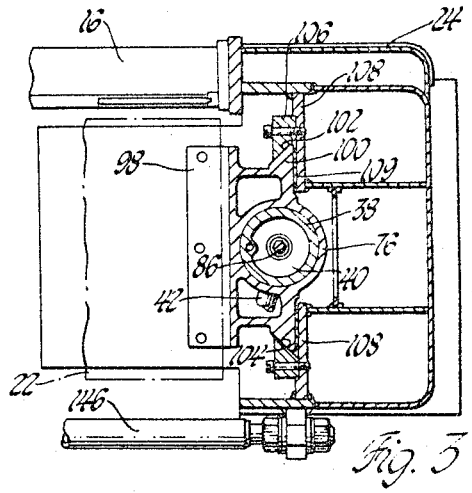
FIGURE 3 is a sectional view taken generally in a plane indicated by line 3—3 of FIGURE 1.
Figure 4:
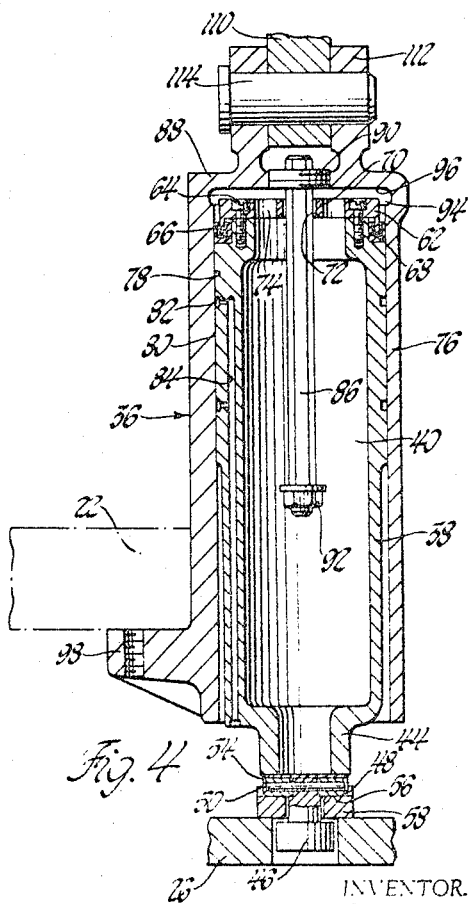
FIGURE 4 is a sectional view taken generally in a plane indicated by line 4—4 of FIGURE 2.

Located within lower compartment 32 is a counter-balance cylinder assembly 36 which is pressurized during press operation to balance or equalize the weight of the movable press components. As best seen in FIGURES 3 and 4, counter-balance cylinder assembly 36 includes a stationary piston 38 with a pressure chamber 40 therein which may be pressurized by introducing a pressure fluid through air inlet tube 42 in reduced neck 44. Piston 38 is anchored to base 26 by pin 46 which has a headed portion loosely received in a bore in the base and a reduced end portion received in a bore in end plate 48 and secured thereto by pin 50. Plate 48 is secured to reduced neck 44 by bolts 52 which when tightened compress gasket 54 to provide an air-tight seal between the piston and plate 48. Surface 56 of nonrotating plate 48 rests upon plate 58 which is secured to base 26 by bolts 60. A plate 62 is joined to the opposite or upper end of piston 38 by bolts 64 and has an outer depending flange 66 received within the recess of U-cup packing 68. The centrally webbed section 70 of plate 62 includes a central aperture 72 and fluid passages 74.

An outer movable housing 76 is received about piston 38 and defines an inner cylindrical surface 78 having a close sliding fit with piston surface 80. To assist sealing and ensure that pressure fluid from chamber 40 does not escape between surfaces 78 and 80, a high pressure fluid may be introduced into annular grooves 82 in surface 80 through the longitudinally extending bore 84 within the wall of piston 38. A stop shaft 86 centrally supported in end wall 88 of housing 76 by sealed plug 90 extends downward through aperture 72 into chamber 40 and has a nut 92 at the lower end thereof engageable with web portion 70 to prevent complete withdrawal of the shaft from chamber 40 on the upward stroke. The maximum travel of shaft 86 within chamber 40 is less than the engaged length of housing 76 with piston 38, thus ensuring that these members cannot disengage while the press is operating. A variable volume chamber 94 formed between plate 62 and inner surface 96 of housing 76 is pressurized by pressure fluid entering from chamber 40 through passages 74. The pressure fluid in chamber 94 acts against surface 96 to support or balance the weight of the movable press components, including movable platen 22 of welding fixture 18 which is supportably carried on support flange 98 on the outer surface of housing 76. As best seen in FIGURE 3, diametrically opposed, outwardly extending flanges 100 on housing 76 have gib surfaces 102 slidably engaged with machined surfaces 104 on guide bars 106 secured to interior plates 108 of frame 24 and wear plates 109. Housing 76 is thus supportably held in a horizontally aligned position but is reciprocally movable in the vertical direction.

A drive rod 110 is pivotally connected to yoke 112 at the top of housing 76 by pin 114 and extends vertically upward through a clearance opening 115 in support member 28 to be pivotally suspended at its upper end from link 116 by pin 118. The clearance bend or knee 119 formed in rod 110 just below pin 118 provides clearance when the rod is raised. Link 116 is affixed to a horizontally disposed shaft 120 journalled in bearing members 122 secured to support member 30. The outboard end of shaft 120 is provided with a gear 123 fixedly secured thereto which cooperates with a sector gear 124 pivotally secured to the frame structure on pin 126. Sector gear 124 includes an arm 128 to which is pivotally attached a drive rod 130 of tandem cylinder assembly 132. The upper cylinder 134 of assembly 132 is a hydraulically operated slave unit which interconnects with a similar unit in side member 14 while lower cylinder 136 serves as the driving unit for the press and is preferably air powered. Cylinder 136 is pivotally supported on a flange 138 secured to frame support member 28. A torque rod 140 interconnects shaft 120 with the matching shaft of side member 14 and functions together with the closed loop hydraulic system of cylinder 134 and its matching unit in member 14 as press control member to synchronize the operation of the two side members and equalize press force. Housing 142, seated atop frame 24, serves as a protective covering for the operating mechanism beneath.

Horizontally extending rails 144 attached to the inner, facing walls of side members 12, 14 support the upper fixed platen 20 of welding fixture 18 in horizontal alignment with platen 22 which, as aforementioned, rests upon the horizontal opposed flanges 98. A guard bar 146 supported by flanges 148 may be provided across the front of the press as a protective measure. The bar 146 is removed while a welding fixture is being inserted or removed from the press.

An air storage tank 150 located at the top of the press supplies air to the chamber 40 through a suitable air circuit (not shown). Air pressure within chamber 40 may be held constant or varied as required to balance the movable mass.

Operation of the press is controlled through an electrical circuit (not shown) activated by depression of a start button by the press operator. Once initiated, air enters power cylinder 136, forcing drive rod 130 to retract and rotating sector gear 124 about its axis, thereby causing rotation of shaft 120 which lifts rod 110 and housing 76 and raises platen 22 upward to press-closed position. After a predetermined hold time during which the welding process occurs, the press opening circuit is actuated allowing air to pass to the lower side of power cylinder 136 to reverse the previously described cycle and return platen 22 to press-open position. The constant air pressure maintained within counter-balance cylinder assembly 36 works against the gravitational force acting on the movable mass so that equal force is required to open and close the press.

One important feature which should be noted about this press is that each of the side members is a fully operational unit which may be used separately as a pedestal-type press. Thus, the unitized press assembly of FIGURE 1 can be easily disassembled by removing the cross-members 16, torque rod 142, and disconnecting certain circuit connectors. Each side member 12 and 14 then may function as a self-contained unit and may be moved to any desired position in the plant and quickly put in operation when connected to the plant air and electrical circuits. On the other hand, two matching but separated side members can be quickly assembled to form the unitized press. Cross-member 16 may be of variable length so that the span between the side members may be adjusted to accommodate welding fixtures of varying widths.

Various changes and modifications can be made in the above-described embodiment without departing from the spirit of the invention. Such changes and modifications are contemplated by the inventor and he does not intend to be limited except by the scope of the claims which follow.

I claim:

1. A welding press comprising, a vertically extending frame, a counter-balance cylinder assembly including a vertically oriented piston having its base anchored to said frame and a housing concentrically received about said piston for sliding movement relative thereto, said piston having an opening through which fluid under pressure can act against the inner surface of said housing, a shaft rotatably supported on an upper portion of said frame, a rod pivotally suspended at one end from said shaft and pivotally connected at the other end to said housing, means on the exterior surface of said housing for supporting the movable platen of a welding fixture, fluid pressure means communicating with said piston for pressurizing the interior thereof to balance the load supported by said housing, and power means for reversibly driving said shaft to reciprocate said housing and thereby locate the movable platen in press-open and press-closed positions.

2. The invention recited in claim 1 wherein said housing includes outwardly extending flanges having guide surfaces thereon slidably movable within vertically oriented guide members on said frame.

3. The invention recited in claim 1 and further including power transfer means comprising a first gear rotatable with said shaft and a sector gear pivotally supported on said frame and engageable with said first gear.

4. The invention recited in claim 3 wherein said power means includes an air cylinder operably connected to said sector gear for reciprocally rotating said sector gear about its pivot.

5. The invention recited in claim 1 and further including support means on said frame for supporting the stationary platen of a welding fixture.

6. The welding press of claim 1 which forms one side member of a unitized press comprising two identical, opposed side members interconnected by rigid cross members.

7. The mechanism of claim 6 wherein the driven shafts of said two side members are interconnected by a torque shaft.

8. The invention of claim 6 wherein the power means of each side member includes a hydraulic cylinder, said cylinders being interconnected by a closed loop hydraulic system for synchronizing operation of the two side members.

9. A welding press comprising a pair of spaced upright side members, a detachable cross-member connecting said side members to form a support structure adapted to receive and support an insertable welding fixture having relatively movable upper and lower platens, each of said side members having a balancing cylinder for equalizing the force required to open and close the press, and identical drive means provided in each of said side members and connected through the balancing cylinder to the welding fixture for moving one of said platens.

References Cited

UNITED STATES PATENTS

| | | | |
|---|---|---|---|
| 2,353,389 | 7/1944 | Cannon | 100—269 XR |
| 2,396,002 | 3/1946 | Frischmann et al. | 100—269 XR |
| 2,951,379 | 9/1960 | Longfield | 100—214 XR |
| 3,140,654 | 7/1964 | Jewett | 219—101 XR |

FOREIGN PATENTS

| | | |
|---|---|---|
| 822,487 | 10/1959 | Great Britain. |
| 870,598 | 6/1961 | Great Britain. |

BILLY J. WILHITE, *Primary Examiner.*